INTEGRATING CONTROL TIMER

Filed July 25, 1956 2 Sheets-Sheet 1

INVENTOR.
JOSEPH J. ZIMMERMANN
BY Andrus & Sceales
Attorneys

Dec. 4, 1962 J. J. ZIMMERMANN 3,067,289

INTEGRATING CONTROL TIMER

Filed July 25, 1956 2 Sheets-Sheet 2

INVENTOR.
JOSEPH J. ZIMMERMANN
BY Andrus & Sceales
Attorneys

United States Patent Office 3,067,289
Patented Dec. 4, 1962

3,067,289

INTEGRATING CONTROL TIMER

Joseph J. Zimmermann, Milwaukee, Wis., assignor to Electronic Secretary Industries, Inc., Waukesha, Wis., a corporation of Wisconsin Filed July 25, 1956, Ser. No. 600,002
22 Claims. (Cl. 179—6)

This invention relates to an automatic integrating control timer particularly adapted for control of remote callback apparatus for automatic telephone answering equipment to permit transmission, in response to a predetermined code, of previously recorded incoming messages.

Telephone answering equipment is used to answer incoming telephone calls when the telephone subscriber is absent or when the subscriber cannot conveniently answer the telephone personally. For example, when doctors and other professional subscribers are out of the office, calling parties can be told where the subscriber can be reached or asked to leave a message. Or, dry cleaners, laundries, repair shops and the like, can accept orders over the telephone without personally answering the telephone. When the subscriber returns to the office or is free to accept the recorded messages, they can be played back over a reproducing apparatus and handled accordingly.

In many instances, the telephone answering equipment is not employed to its full effectiveness by subscribers such as doctors, repair men and others who leave the office or shop because the subscriber cannot conveniently return to his telephone until a substantial time has elapsed. When the subscriber does return, he may often find that he is too late to take care of the recorded call or perhaps that he must return to an area he just left or could have gone to much more rapidly and conveniently by another route.

The usefulness of the telephone answering equipment can be increased by providing a remote callback device which permits the subscriber to call his own telephone and receive all of the recorded messages.

In accordanec with the present invention, the incoming calls are recorded on any suitable telephone answering equipment having a recording medium adapted to be played back, i.e., reproduced by an associated reproducer in the equipment. As the incoming calls are recorded, an integrating timer is actuated to set a control circuit in accordance with the number of incoming calls. When the subscriber wishes to play back the recorded messages, he may call the recording telephone station from a remote telephone by placing a conventional telephone call. The telephone answering device will answer the call. The calling subscriber then sends a signal over the telephone lines which actuates the remote playback mechanism and the control circuit including circuit altering means which automatically completes the whole playback cycle. The control circuit and remote playback mechanism includes control means to first reset the recording mechanism to its initial position, if necessary, then to reproduce the recorded messages, and finally to reset the answering equipment to standby.

The present invention provides an accurate and simple index control to recycle a previous sequence of operations such as the remote playback of messages recorded on a recorder which is operatively associated with a telephone.

The drawing furnished herewith illustrates the best mode presently contemplated for carrying out the invention.

Figures 1, 2, 3:
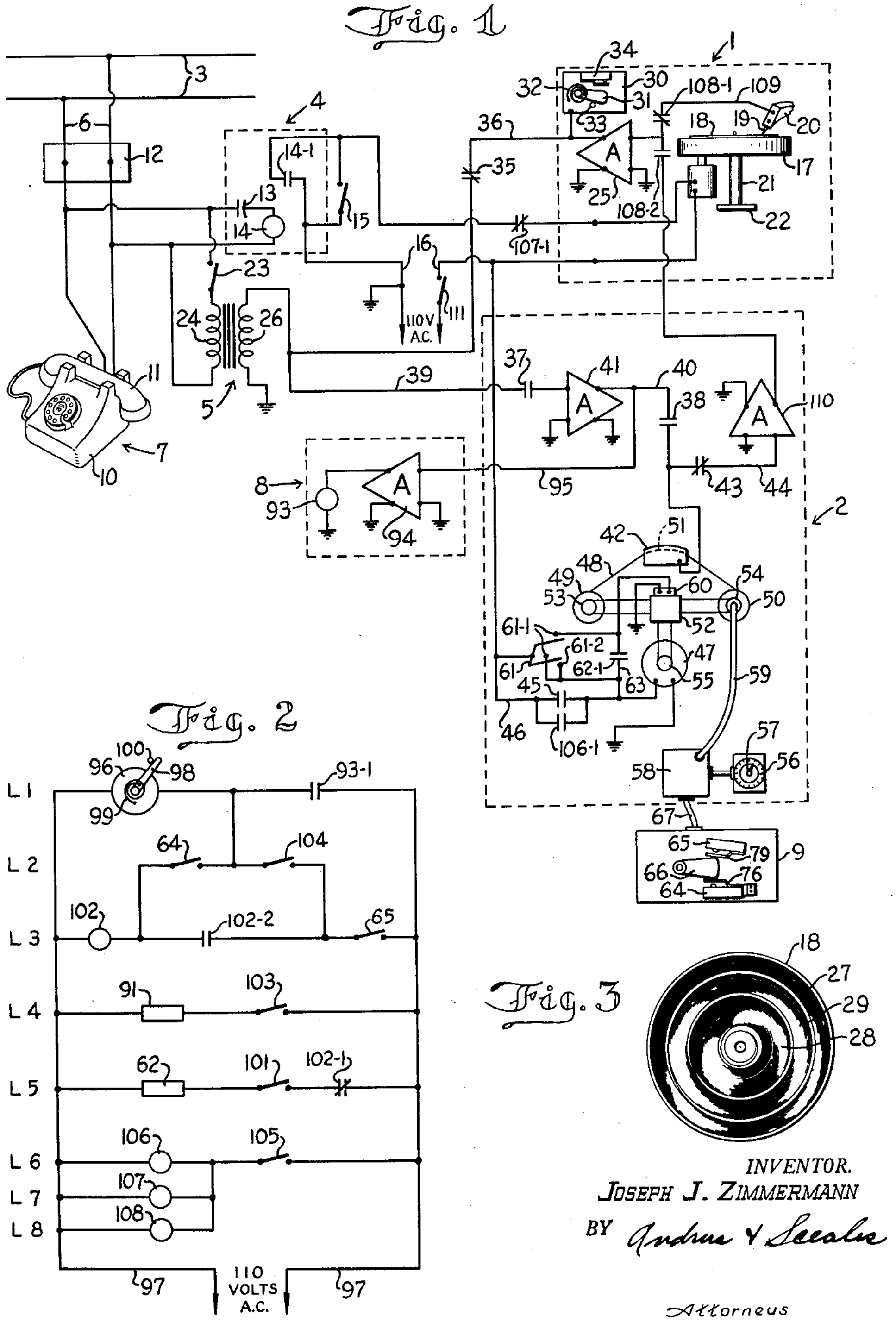
FIG. 1 is a schematic electrical circuit of a telephone answering device incorporating a remote callback unit made in accordance with the present invention.
FIG. 2 is a schematic control circuit for actuation and control of the remote playback function.
FIG. 3 is a plan view of an outgoing message record.

Referring to the drawings and particularly to FIG. 1, the illustrated telephone answering equipment comprises, in general, a reproducer 1 and recorder 2 connected to main telephone lines 3 through a trigger circuit 4 and a coupling transformer 5. The trigger circuit 4 and the coupling transformer 5 are each connected across the telephone branch lines 6 which connect a subscriber's telephone 7 to the main lines 3. A second triggering circuit 8 is connected to the circuit of the recorder 2 and controls the playback control circuit, shown in FIG. 2, as hereinafter described. An integrating timer 9 is mechanically coupled to the recorder 2 to provide an index of elapsed recording time as subsequently described.

The telephone 7 is a conventional desk set having a base 10 and a handset 11 resting on the base. The telephone 7 is connected to the main telephone lines 3 by the branch lines 6 through a terminal block 12 in a conventional telephone line circuit.

The telephone answering equipment may be of any suitable variety which automatically answers the telephone and records the incoming messages. Apparatus to reproduce the recorded message, if not included in the recorder, must also be provided.

The illustrated reproducer and recorder are connected to automatically answer the telephone in a manner similar to that more fully described in the applicant's copending application entitled Tone Controlled Telephone Answering Device filed June 15, 1953, Serial No. 361,593. For the purposes of the present patent, the reproducer and the recorder and their connection to the telephone lines 3 are only illustrated and described in such detail as is necessary to clearly set forth the present invention.

The normal answering cycle is initiated by the triggering circuit 4 which comprises a series connected capacitor 13 and a relay 14. The capacitor 13 blocks the direct current normally circulating in the telephone circuit and restricts actuation of the relay 14 to a ringing current.

Each time ringing current flows, the relay 14 pulls in a set of contacts 14–1 which complete the power circuit to the reproducer 1 which then begins a cycle of operation. After a predetermined period of reproducer operation, the reproducer mechanically closes a latching switch 15 which bridges the contacts 14–1 and locks the reproducer to power lines 16.

The illustrated reproducer comprises a rotating turntable 17 adapted to support a disc type record 18 in engagement with a reproducing stylus 19. The stylus 19 is carried by a tone arm 20 which moves from the outer edge to the center of record 18 during the reproducing cycle and which is automatically returned to the outside of the turntable upon the movement of tone arm to the center of the record 18 through a turntable mechanism, not shown. Included in the turntable mechanism is a vertically moving pin 21 carrying a radially extended arm 22 which is adapted to simultaneously actuate the latching switch 15 and also a second switch 23 connected in series circuit with a coil 24 of transformer 5. Thus, when switch 23 closes, the coil 24 is placed across the telephone lines 3 to simulate the answering of telephone 7. The reproducing stylus 19 is connected through a suitable amplifier 25 to a coil 26 of transformer 5. The coil 26 is magnetically coupled to the coil 24 to transmit the message on the record 18 to the calling party.

As shown in FIG. 3, the record 18 has cut thereon a first outgoing message 27 and a second outgoing message 28 which are separated by a recording and control tone portion 29.

The first message 27 informs the calling party that the telephone is being answered by a machine and that a message may be left after the calling party hears a tone signal.

At the end of the first message 27, the signal from signal portion 29 is transmitted to the calling party. The signal in the present embodiment is a continuous tone.

The signal from portion 29 is also fed to a recording timer 30 which includes a motor, not shown, energized in response to sound currents from the amplifier 25. The motor drives a switch arm 31 which is biased as by a spring 32 to an initial position against a stop pin 33. A switch 34 is supported in the path of the arm 31 for actuation and in spaced relation to the switch arm 31 to provide a time delay between initial energization of the recording timer and switch actuation. Thus, although the periodic sound currents of the first outgoing message 27 are applied to the timer 30 and effect movement of the switch arm 31, the spring 32 returns the arm 31 to the initial position between the current pulses and only the continuous tone signal current arising from portion 29 continuously drives the arm 31 to close the switch 34. Further, so long as the tone signal currents are applied to the recording timer, the switch 34 is held closed. When the signal currents stop, the timer is de-energized and the arm 31 immediately returns to its initial position and the switch 34 opens.

The switch 34 controls suitable electromagnetic devices, not shown, to operatively disconnect the reproducer 1 and to operatively connect the recorder 2 for the period of energization of the recording timer 30. It is deemed sufficient to state that the switch effectively opens the connection between the reproducer 1 and the coupling transformer 5 such as by opening a set of normally closed contacts 35 in a lead 36 from the amplifier 25 to the transformer 5. The switch 34 also effects the closing of two sets of contacts 37 and 38 in recording lines 39 and 40 connecting a recording amplifier 41 and a recording head 42 in circuit with the transformer 5 and opens a set of contacts 43 in a reproducing line 44 connecting head 42 and amplifier 25 as well as closing a set of contacts 45 in a hot power lead 46 for a recorder drive motor 47 to permit recording of an incoming message by the recorder 2.

The illustrated recorder 2 comprises a wire 48 initially wound upon one storage reel 49 and adapted to be longitudinally advanced past the reproducing and recording head 42 and then wound upon a second storage reel 50. The head 42 is provided with a wire guide groove 51 to guide the wire in advancing between the storage reels.

The head 42 is a conventional unit normally containing an erase coil, not shown, to clear the wire 48 during the recording cycle and a second coil, not shown, which is adapted to record the message on the wire and also to pick up a previously recorded message for playback. Individual coils may be at times employed for the recording function and reproducing function, respectively, if desired.

To transfer the wire 48 between the storage reels 49 and 50, the drive motor 47 is coupled through a reversible coupling 52 to a pair of shafts 53 and 54 supporting the respective reels 49 and 50. The coupling 52 normally couples the motor shaft 55 in driving relation to the shaft 54 of the second storage reel 50 and drives the reel 50 in a forward direction, unwinding the wire 48 from the initial storage reel 49 and winding it upon reel 50.

The incoming messages are recorded on the wire 48 as it passes the recording head 42 in the conventional manner when the recording timer 30 is actuated as previously described.

As the various messages are received by repeated answering of the telephone, they are indicated on a suitable dial 56. An associated rotatable indicator 57 is connected through a gear reduction box 58 and a flexible cable 59 to the shaft 54 of reel 50 to drive the indicator 57 in synchronism with the reel 50 but at a substantially reduced rate. The rotation of the indicator 57 is geared down in the gear box to coordinate one revolution of the indicator 57 with the complete transfer of the wire 48 from the initial storage reel 49 to the final storage reel 50.

As previously noted, the incoming message period is controlled by the spacing of the two outgoing messages on the record. After the signal portion 29 is traversed by the stylus 19, the recording timer 30 is de-energized and the switch 34 opens. The contacts controlled by the timer 30, as previously described, return to their normal position and thereby return the apparatus to outgoing message transmitting operation by disconnection of the recorder 2 and the reconnection of the reproducer 1 to the telephone lines 3. The second outgoing message 28 is transmitted and conveys any desired information such as informing the calling party that if he wishes to give further information to please call again.

At the end of the second message 28, the tone arm 20 moves rapidly to the center of the record 18 and then returns to the outside of the turntable 17. In so doing, the turntable mechanism retracts the pin 21 and opens the associated switches 15 and 23 to return the answering equipment to standby position.

To play back the recorded messages after the subscriber returns or by the remote callback as hereinafter described, a solenoid 60 is connected to the coupling 52 and when energized changes the coupling of the wire recorder motor 47 from the reel shaft 54 to the reel shaft 53 to drive the shaft 53 and associated reel 49 in rewind direction, shown in FIG. 1 as a counterclockwise direction. This returns the wire 48 which was transferred to storage reel 50 during the recording cycle back to the initial storage reel 49. The solenoid 60 is then de-energized and the motor 47 again drives the wire 48 in a forward direction past the reproducing head 42 which transmits the recorded messages through a loudspeaker, not shown, for local listening or over the telephone lines 3, as subsequently described.

A paralleled switch 61 and a set of contacts 62–1 of relay 62, connected in line L–5 of the circuit shown in FIG. 2, are connected in a power line 63 leading to the solenoid 60 to control local playback and remote playback, respectively. The switch 61 is a manually operated switch on the recorder 2 which completes the circuit for solenoid 60 and the wire recorder motor 47 for local playback.

The switch 61 is a double pole switch having an upper position where it engages a set of contacts 61–1 which provides current directly to the solenoid 60 and the wire recorder motor 47 to rewind the wire 48 to the initial reel 49. When the wire 48 is rewound, the switch is closed to a lower position where it engages a contact 61–2 which provides current only to the wire recorder motor 47 and therefore drives the wire 48 in a forward direction for reproduction of the previously recorded messages.

The set of contacts 62–1 which is in parallel with switch 61 is remotely controlled, as subsequently described, and completes the circuit for solenoid 60 for remote playback.

To condition the apparatus for remote callback, the integrating timer 9 is connected to the answering equipment and a control circuit is established during the recording cycle which, upon actuation, automatically effects the rewinding of the wire 48 to the initial storage reel 49 and then the reproducing of the recorded messages over the telephone lines 3.

Referring to FIG. 1, the integrating timer 9 comprises, in general, a stationary limit switch 64 and a movable limit switch 65 both of which are actuated by a rotating cam 66. The rotating cam 66 moves the switch 65 and is connected to the gear reduction box 58 by a flexible cable 67 and is driven in synchronism with the operation of the recorder motor 47 to angularly index the switch 65 with respect to the first switch 64 in accordance with the elapsed recording time. As more fully described hereinafter in connection with the description of the circuit shown in FIG. 2, the switch 64 stops the wire rewind operation and the switch 65 stops the playback cycle.

Figure 4:
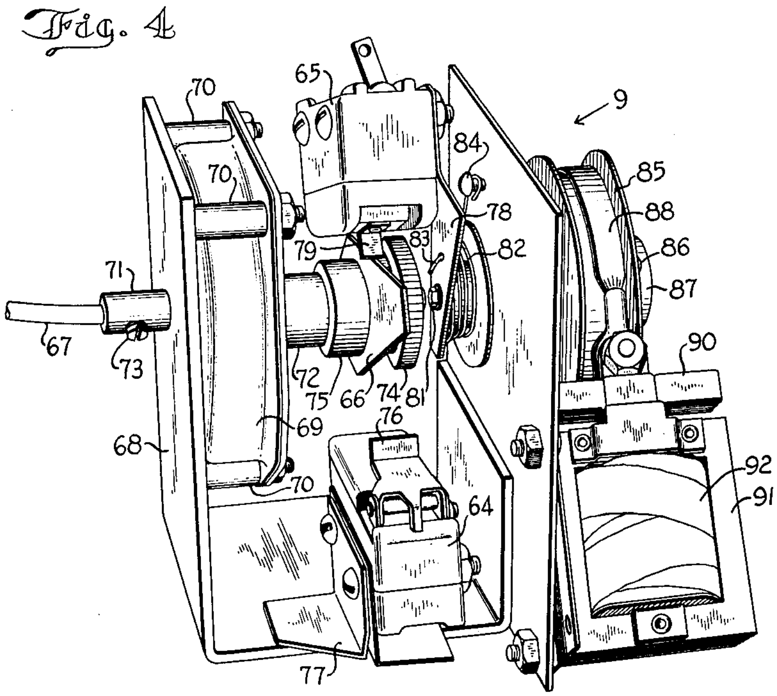
FIG. 4 is a perspective view of a remote callback timer.
Figure 5:
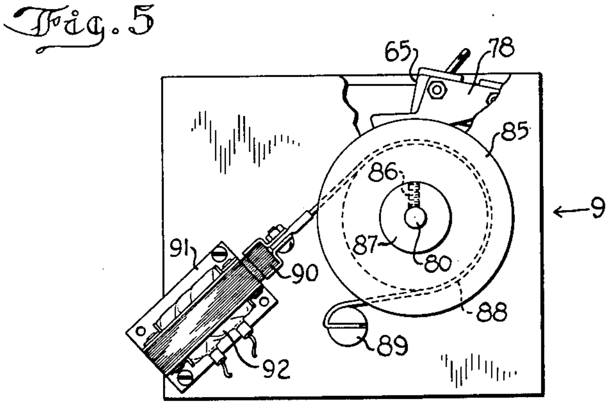
FIG. 5 is a side elevational view of the timer shown in FIG. 4 with a part broken away to show certain details of the timer.

As more clearly shown in FIGS. 4 and 5, the integrating timer 9 physically comprises a channel support or mounting bracket 68 with a gear reduction box 69 secured to one wall of the bracket as by bolts 70 to support an input shaft 71 and an output shaft 72 which are coupled together within the gear box 69. The flexible cable 67 is attached to the input shaft 71 as by a setscrew 73 and connects the shaft 71 and the gear system within gear box 58 to thereby rotate the output shaft 72 at a greatly reduced speed. The rotating cam 66 is secured to the end of the output shaft 72 by a knurled bolt 74 which threads into the end of shaft 72 and binds the cam between the bolt 74 and a shoulder 75 on the shaft. Because of the gear reduction in box 69, the cam 66 rotates through a relatively small arc with complete transfer of the wire 48 from the reel 49 to the second reel 50. The cam movement provides an index of the amount of the tape movement or elapsed recording time. In its initial position corresponding to no recorded messages, the cam 66 is immediately adjacent a switch arm 76 of the limit switch 64 which is secured, as by a bracket 77, to the base of the channel bracket 68. During the recording to incoming messages, the cam 66 rotates away from the limit switch 64 and the distance therebetween is always directly proportional to the length of recording tape used up.

The second limit switch 65 is supported on the end of a rotatable arm 78 which is biased to dispose the switch 65 in constant engagement with the cam 66, with the latter operatively engaging a switch arm 79 of switch 65. Consequently, as the cam 66 rotates during the recording of incoming messages, it continuously positions the switch 65 from its initial position and therefore from the limit switch 64 an arcuate distance which is proportional to the elapsed recording period.

The cam arm is rotatably secured, with the attached switch 65 disposed within the mounting bracket 68, to a shaft 80 as by bolt 81. The shaft 80 extends through the channel side which is opposite the gear reduction box 69 and is journaled in a bearing, not shown, secured to outer surface of the channel side. A coil spring 82 is wound about the shaft 80 with one end secured to the rotatable arm 78 as at 83 and the opposite end secured to the channel as by a screw 84 threaded in a suitable opening in the channel wall. The coil spring 82 continuously biases the arm 78 and the attached switch 65 toward the positioning cam 66.

A brake drum 85 is secured to the opposite end of the shaft 80 by a setscrew 86 which passes through an opening in a drum hub 87 and bears on the shaft. A brake tape 88 is wrapped about the periphery of the drum and is securely attached at one end to a pin 89, shown in FIG. 5, extending from the side of the channel support 68 and at the opposite end to an armature 90 of a solenoid 91 which is attached to the channel support. When the winding 92 for solenoid 91 is not energized, the tape 88 is loose and the drum 85 and attached shaft 80 are free to rotate about the axis of shaft 80. But, when the solenoid winding 92 is energized, it retracts the armature 90 and wraps the tape 88 tightly about the drum 85 to brake and lock the drum 85 and attached shaft 80. Consequently, the limit switch 65 which is secured to the arm 78 is then held in position independently of the positioning cam 66 which can, as subsequently described, return past its initial position and actuate the switch 64.

The operation of the timer 9 for playback is controlled through a control circuit, shown in FIG. 2, which is operatively connected to the telephone lines 3 through the timer trigger circuit 8, shown in FIG. 1 and which automatically completes a playback cycle after initial energization.

Referring to FIG. 1, the timer trigger circuit 8 includes a relay 93 connected through an amplifier 94 to the output of the recording amplifier 41 by a lead 95. The trigger relay 93 is connected to the circuit through the recording amplifier 41 to isolate the relay 93 from the circuit of the reproducer 1, for reasons to be subsequently described.

When the relay 93 is energized, it pulls in a set of contacts 93–1 in line L–1 of FIG. 2 and connects a switch motor 96 across a set of control power lines 97. The switch motor 96 drives an arm 98 which is adapted to simultaneously actuate a series of switches which are subsequently described. A coil spring 99 continuously biases the arm 98 to an initial position against a stop pin 100 which is disposed in spaced relation to the associated switches which are, therefore, only actuated after a predetermined period of continuous motor energization. This time delay between motor energization and switch actuation is necessary to prevent actuation of the playback cycle by the short pulses established by incoming message currents which are placed on the relay 93.

The playback cycle is thus coded to any continuous signal. For example, the subscriber may be provided with a small, pocket-type oscillator, not shown, which sends a continuous signal over the telephone lines 3 and through the transformer 5 and recording amplifier 41 to the relay 93 which remains energized for the length of the signal. As the playback cycle is coded to a continuous code, the isolation of the relay from the reproducer 1 eliminates the possibility of relay actuation in response to the signal from continuous signal portion 29 on the outgoing message record 18.

The continuous energization of the relay 93 maintains the associated contacts 93–1 closed and the switch motor 96 drives the arm 98 against the bias of the spring 99 into a switch actuating position.

The arm 98 closes a switch 101 in line L–5 and completes the power circuit for the rewind relay 62 through a normally closed set of relay contacts 102–1 of a relay 102 in line L–3. When relay 62 is energized, it closes the contacts 62–1 in the power line 63 for the rewind solenoid 60 which then changes the coupling 52 of the wire recorder motor 47 from storage reel 50 to storage reel 49 to rewind the wire 48 back onto the starting reel. The switch cam 66 simultaneously rotates in a reverse direction toward the switch 64 and away from the switch 65.

Simultaneously, the arm 98 closes a second switch 103 in line L–4 of FIG. 3 to energize the brake solenoid 91 and thereby tighten the brake tape 88 upon the brake drum 85 to hold the limit switch 65 in position independently of the cam 66.

The arm 98 also closes a switch 104 in line L–2 to by-pass the trigger contact 93–1 in line L–1 and to latch the motor 96 in circuit through the limit switch 65 in line L–3 which closes as the cam 66 is driven in a reverse direction. The arm 98 is now held in a switch actuating position until the latch to the motor 96 is broken.

A motor actuated switch 105 in L–6 is also simultaneously closed to energize three parallel connected relays 106, 107 and 108 in lines L–6, L–7, and L–8, respectively, having a plurality of contacts in the reproducing and recording circuit to stop the reproducer 1 and start the recorder 2.

Referring to FIG. 1, the relay 106 closes a set of normally open contacts 106–1 connected in parallel across the contacts 45 in the power line 46 for recorder motor 47, and energizes the recorder motor which then rewinds the tape 48 to the starting reel 49 as long as solenoid 60 is energized.

The relay 107 opens contacts 107–1 in the main power line 16 to the reproducer 1 as shown in FIG. 1, and stops the reproducer 1. The relay 108 opens a set of contacts 108–1 in the line 109 from the reproducer tone arm 20 to the reproducer amplifier 25 and closes a set of contacts 108–2 in the line 44 connecting a playback preamplifier 110 to the reproducer amplifier 25.

When the reproducer 1 stops, the tone signal from record portion 29 is no longer fed to the recording timer 30 and consequently the contacts 38 in the recording line 40 open and the contacts 43 in the reproducing line 44 and the contacts 35 in line 36 both close to condition the recorder 2 for reproducing the messages on the wire 48. The reproduction of the recorded messages is transmitted to the transformer 5 through the preamplifier 110 in the line 44 and then through the reproducer amplifier 25 which is connected to the preamplifier through the closed contacts 108–2.

As the wire 48 is rewound onto the initial reel 49, the flexible shaft 67 to the integrating timer 9 is simultaneously driven in a reverse direction and rotates the switch cam 66 toward its initial position. As the wire 48 is rewound past its initial starting position, the cam 66 is also driven past its initial starting position and actuates the limit switch 64 disposed within its path, as previously described. Referring to FIG. 2, the switch 64 is connected in line L–2 of the playback control circuit.

When the limit switch 64 in line L–2 is closed, an energization circuit for the relay 102 in line L–3 is completed through the switches 64 and 104 in line L–2 and the limit switch 65 in line L–3.

The relay 102, upon energization, opens the set of contacts 102–1 in line L–5 and closes a set of contacts 102–2 in line L–3.

The contacts 102–2 in line L–3 are a set of latching contacts which maintain the energization of the relay 102 until the limit switch 65 in line L–3 is opened at the end of the playback cycle.

The other contacts 102–1 in line L–5 open the circuit to the rewind relay 62 which then is de-energized and opens contacts 62–1 in line 63 to the rewind solenoid 60 which changes the drive coupling 52 of the wire recorder 2 which is then again operated in a forward direction.

Thus, the actuation of the limit switch 64 by the timer cam 66 stops the rewinding operation and places the wire recorder 2 in condition to transmit the previously recorded messages.

The wire 48 is driven past the reproducing head 42 which picks up the messages recorded on the wire and transmits them in the form of electrical signals over the telephone lines 3 via the preamplifier 110, the amplifier 25 and the coupling transformer 5.

As the recorder transfers the wire to the second reel 50, the positioning cam 66 is again being driven in synchronism toward the limit switch 65 in exactly the same direction as when the messages were originally recorded, as previously described.

When all the recorded messages have been transmitted, the cam 66 engages the limit switch 65 which is held against further movement by the brake drum 85 and tape 88. The cam 66 depresses the switch arm 79, shown in FIGS. 1 and 4, and opens the switch 65 in line L–3.

When the switch 65 opens, the power circuit for the switch motor 96 opens and the motor is de-energized. The motor 96 is then no longer energized against the spring bias of spring 99 and the switch arm 98 returns back to its initial position and the various motor actuated switches return to normal position.

Thus, power is again supplied to the main reproducer 1, which begins operating where it was stopped and completes its normal cycle of operation.

A main control switch 111 is connected in the main power lines 16 to place the apparatus in standby position.

The operation of the illustrated embodiment of the invention is summarized as follows:

When the subscriber leaves the telephone 7, he closes the main control switch 111 which places the telephone answering equipment in a standby position.

All incoming calls to the telephone 7 actuate the trigger circuit 4 which places the reproducer 1 and the recorder 2 in cycle. The reproducer 1 sends out the previously recorded messages on the record 17 and the recorder 2 records a message from the calling party.

As the messages are recorded, the timer switch 65 is moved or indexed in accordance with the amount of the wire 48 used up in answering the telephone 3.

When the subscriber wishes to know the recorded messages, he may call his own telephone number from any other telephone in the conventional manner. This places the answering equipment into a cycle of operation. The subscriber waits until the end of the first outgoing message and the equipment begins the recording cycle. At that time, he transmits a continuous signal such as from a small, pocket-type oscillator. This continuous tone is transmitted through the coupling transformer 5 and the recording amplifier 41 to the playback trigger circuit 8 and, after a couple of seconds, the playback cycle is established.

When the playback cycle is established, the limit switch 65 is locked in a position proportional to the length of wire 48 to be played back.

The wire 48 is rewound past its starting position and simultaneously the positioning cam 66 is returned past its starting position. The cam 66 then actuates the switch 64 which stops the rewind operation and results in a return to the forward drive connection.

The recorded messages are transmitted to the subscriber and after all have been transmitted, the cam 66 strikes the switch 65 and the playback apparatus returns to standby position.

The reproducer 1 then completes its cycle of operation with the tone arm 20 finally moving to the outside of the turntable 17. The control pin 21 then retracts and opens the latch switch 15 and load switch 23 and the answering equipment returns to standby position.

In the described embodiment of the invention, after the playback of the recorded messages, the reproducer 1 operates to transmit the balance of the tone signal portion 29 on the record 18 and consequently the answering equipment is in a recording cycle. Therefore, the subscriber can leave a message. For example, he may wish to leave instructions based on the information received by the playback of the recorded messages to another party who can call in and through the actuation of the playback apparatus receive the instructions.

Newly received messages can be recorded on the balance of the wire 48, with the integrating timer 9 being automatically set accordingly. The subscriber can call in subsequently and receive these messages.

On the second playback, the messages played back on the first playback as well as subsequent to the first playback are transmitted because the timer 9 is not reset to a zero recorded message index by a playback cycle, in the illustrated embodiment of the invention. The timer 9 may be automatically reset to a zero recorded message index by repositioning of the switch cam 66 and switch 64 together in response to ending of the playback cycle. Thus, the switch 64 could be moved forwardly until it engages the cam 66 or the latter could be returned to the switch 64 through any suitable mechanism in response to actuation of switch 65 at the end of the playback cycle, for example.

The particular integrating timer may be replaced with any other suitable apparatus having means to move a switch means or other circuit altering means in synchronism with the use or operation of the recording medium and also having means to lock the switch means or the like in position for actuation at the end of the playback cycle. For example, applicant's copending application for a Timing and Holding Apparatus, Serial No.

463,977, filed October 22, 1954, discloses an A.C. motor which could be employed to move the switch means and a circuit for application of a D.C. power to the motor to lock its shaft which would hold the switch means in position. Suitable switching apparatus responsive to the playback would effect the application of the D.C. power to the motor.

Although the playback operation is coded to a continuous code, any other suitable code can be employed. For example, the apparatus could be coded to a series of numbers which the subscriber would dial at the same time the continuous code is given in the described embodiment or at any other time after the telephone is answered.

Further, the particular reproducing and recording equipment described can be replaced with any other conventional reproducing and recording equipment. The recorder is necessarily adapted to play back information recorded.

Although the recorded messages are normally due to the automatic answering of the telephone, the recorder may be provided with a local recording apparatus. Then, a message may be recorded directly on the incoming message recording medium for transmission through the playback cycle.

Various modes of carrying out the invention are contemplated as being within the scope of the following claims particularly pointing out and distinctly claiming the subject matter which is regarded as the invention.

I claim:

1. In an automatic playback device for telephone answering equipment having a movable record adapted to move from an initial position and relatively stationary means associated therewith to successively record individual incoming messages and having means responsive to a telephone ringing signal received over a telephone line circuit to operatively connect a load circuit to the line circuit to simulate answering of an associated telephone, a relatively stationary reproduction means disposed adjacent the initial position of said record to reproduce the recorded incoming messages and adapted to be connected to the telephone line circuit in response to said incoming ringing signal, automatic control means adapted to reset said record with respect to said reproduction means to position the record with the start of recorded incoming messages recorded subsequent to any previous playback of previously recorded incoming messages aligned with the reproduction means to complete the reproduction of said additional previously recorded incoming messages and to then disconnect the reproduction means from the telephone line circuit, said automatic control means completing a cycle of operation incident to initial actuation thereof, and means responsive to a coded incoming signal received over the load circuit to initiate operation of said automatic control means.

2. Telephone answering apparatus operatively connected with a telephone line circuit to simulate answering of an associated telephone, in combination, means to record incoming messages including a relatively stationary recording means and a record adapted to successively transverse said recording means, circuit means adapted to connect the recording means to the telephone line circuit, means responsive to an incoming signal for said telephone to operatively connect the recording means to the telephone line circuit through said circuit means to permit reception of incoming signals, playback means disposed adjacent said recording means and adapted to reproduce the recorded messages, trigger means operatively connected to said circuit means and responsive to a predetermined signal to operatively connect the playback means in a playback circuit with said telephone line circuit to transmit said recorded messages, and automatic control means operatively connected to said playback means and to said playback circuit and to said trigger means to sequentially effect the resetting of said record with respect to said reproduction means and to position the record with the start of recorded incoming messages recorded subsequent to any previous playback of previously recorded incoming messages aligned with the reproduction means to complete the reproduction of all said additional previously recorded messages and to then disconnect the playback means and to open said playback circuit all in response to said predetermined signal.

3. A remote playback device for automatic telephone answering equipment having a recording medium transferred between a pair of storage means past a recording and reproducing head during a recording cycle and a playback cycle and having means to rewind the recording medium to the initial storage means, said recorder being connected to a telephone line circuit in response to incoming ringing signal, which comprises control means adapted to temporarily stop the recording cycle and to sequentially automatically rewind the recording medium carrying recorded incoming messages recorded subsequent to a previous playback of previously recorded incoming messages to the first storage means and then wind the recording medium to the second storage reel for reproduction of only the messages on the recording medium recorded subsequent to a previous playback of previously recorded incoming messages and to operatively connect the head to an associated telephone line circuit in a transmission circuit and to finally stop the movement of the recording medium and disconnect the head from the telephone line circuit in response to completion of the reproduction of the recorded messages and to again start the automatic recording cycle, said automatic control means completing a cycle of operation incident to initial actuation thereof, and means responsive to a coded signal received over the telephone line circuit after the start of the recording cycle to initiate operation of the control means.

4. Telephone answering apparatus operatively associated with a telephone line circuit and having a normal answering cycle comprising, in combination, electrical coupling means connected in a circuit with said telephone line circuit to permit transmission and reception of varying electric current signals over the telephone line circuit, a reproducer operatively associated with said coupling means to transmit an outgoing message and adapted to control a normal answering cycle including latching of said coupling means in operative connection in the circuit with the telephone line circuit incident to an incoming ringing signal, a recorder operatively associated with said coupling means and said reproducer to record incoming messages during a normal answering cycle, playback means operatively associated with said coupling means to play back the recorded incoming messages over said telephone line circuit, playback control means connected in a circuit with said coupling means and actuated by electrical signals established in said coupling means and adapted to operate the playback means to play back only the recorded messages received subsequent to any previous playback of previously recorded incoming messages and to stop the reproducer during the operation of the playback means incident to receipt of a single incoming coded signal, said playback control means including code responsive means coded to respond to only a continuous electrical signal of predetermined period to prevent actuation of the control means by electrical signals of duration less than said predetermined period, and means responsive to incoming ringing current to actuate said reproducer and initiate the normal answering cycle.

5. Telephone answering apparatus according to claim 4 wherein the code responsive means of said playback control means comprises an electromagnetic means energized in response to the electrical signals in said coupling means and having actuating means biased to an initial position in spaced relation to circuit altering means and operatively engaging the circuit altering means after a predetermined period of continuous operation of the electromagnetic means longer than the electrical signals normally established in said coupling means during the answering operation of the reproducer and the recorder, said circuit altering means being adapted to latch in a control circuit to play back the recorded messages and to stop the reproducer during the play back of the recorded messages, whereby said control means is coded to a continuous electrical signal to be transmitted over the telephone line circuit after initiation of a normal cycle by a calling party.

6. Telephone answering apparatus according to claim 4 wherein said coupling means comprises a transformer having a winding in series with a mechanically actuated switch connected across said telephone line circuit, and said reproducer includes a movable member operatively associated with said switch, said member closing said switch in response to a predetermined period of reproducer operation and opening said switch at the end of the normal answering cycle whereby said switch is held closed during the play back of the recorded messages.

7. In a remote playback device for telephone answering equipment operatively connected in a telephone line circuit and having recording means, reproducing means operatively associated with the answering equipment and being adapted to reproduce the messages recorded by the recording means and being adapted to transmit the messages over the associated telephone line circuit, an indexed circuit control means operatively associated with said recording means and automatically positioned in accordance with actuation of the recording means, said indexed circuit control means being operatively connected to said reproducing means to reset the reproducing means to standby, means responsive to an incoming signal received over the telephone line circuit to actuate the means to reproduce the recorded messages, and means responsive to the reproduction of the last recorded message to actuate the indexed circuit control means.

8. In automatic playback apparatus for automatic answering equipment operatively associated with a telephone circuit and having a recording means to record incoming telephone messages, a playback means including circuit means adapted to play back the recorded messages over the associated telephone circuit, means responsive to a continuous signal received over the telephone circuit to actuate the playback means to transmit the recorded messages, circuit control means operatively associated with said playback means and said recording means and being ahtomatically indexed in accordance with the actuation of said recording means, and means responsive to the play back of the recorded messages to actuate the circuit control means to terminate operation of the playback means at the termination of the last recorded message.

9. A remotely controlled playback device for automatic telephone answering apparatus operatively connected in a telephone line circuit and adapted to record incoming messages on a recording medium during successive recording cycles, which comprises reproducing means to reproduce the messages recorded on the recording medium, said reproducing means and said recording medium having an initial starting position, said recording medium advancing relative to said reproducing means during the recording of incoming messages, means to reset the recording medium with respect to said reproducing means to position the reproducing means adjacent the start of recorded incoming messages recorded subsequent to any previous playback of previously recorded incoming messages, playback control means responsive to a predetermined incoming signal received over the telephone line circuit and different than a normal ringing signal or talking signal to actuate the means to reset the recording medium and to connect the reproducing means to the telephone line circuit for the transmission of the said additional previously recorded messages, and means in said playback control means automatically established in synchronism with said recording cycles and being responsive to the reproduction of all said additional previously recorded messages to return the playback device to standby to permit playback of subsequently recorded messages.

10. Apparatus for remote play back of messages recorded by automatic answering equipment operatively connected to a telephone line circuit, said answering equipment having a recording medium transferred from one storage means to a second storage means during the recording cycle, which comprises reproducing means disposed intermediate said storage means and in operative relation to said medium to reproduce the messages on the recording medium, means to interrupt the operation of the automatic answering equipment and to return the recording medium from said second storage means to said first storage means in response to a predetermined incoming signal from said telephone line circuit after actuation of said automatic answering equipment, means responsive to the return of the recording medium containing said recorded messages to the first storage means to retransfer the recording medium to the second storage means, means to operatively connect the reproducing means to the telephone line circuit to transmit the recorded messages over the telephone line circuit in response to said predetermined incoming signal, and means responsive to the retransfer of the recording medium containing recorded messages thereon to the second storage means to discontinue the playback cycle and return the apparatus to standby to permit recording of incoming messages and playback of such subsequently recorded incoming messages.

11. In automatic telephone answering apparatus operatively connected with a telephone line circuit in response to an incoming answering signal, a recording medium, recording means operatively connected with said telephone line circuit to answer the telephone in response to an incoming ringing signal and to record incoming messages on said recording medium, an initial storage means for said recording medium, a second storage means for said recording medium, transfer means to transfer said recording medium past said recording means and from said initial storage means to said second storage means to record the incoming messages thereon, indexing circuit control means biased in an initial direction and adapted to return the answering apparatus to standby to answer an incoming telephone call, operating means including a movable member operatively associated with said last-named means and said transfer means to transfer the recording medium and to position and hold the indexing circuit control means in accordance with the transfer of said recording medium to said second storage means, control means responsive to a predetermined incoming playback signal other than the answering signal received over said telephone line circuit to lock said indexing circuit control means in its indexed position and to retransfer the recording medium to its initial storage means and to move said movable member away from said indexing circuit control means in accordance with the return of the recording medium to said initial storage means, switch means disposed in the path of the movable member and adapted to be actuated thereby when the movable member returns past its initial position, said switch means being connected with said transfer means and said control means and adapted to operatively disconnect the control means to discontinue the retransfer of the recording medium to the initial storage means and to operatively connect said transfer means to again transfer the recording medium to the second storage means, a reproducing means connected in circuit with the telephone line circuit and disposed adjacent the recording medium, and means responsive to the playback signal to operatively connect the reproducing means to the telephone line circuit to transmit the recorded messages, said operating means engaging the locked indexing circuit control means after transmittal of said recorded messages to return the apparatus to standby.

12. A remotely controlled playback device for automatic answering equipment adapted to be operatively associated with a telephone line circuit to answer a telephone connected to the circuit in response to an incoming ringing signal, said equipment including a recording and a reproducing coil means disposed adjacent a recording medium which is adapted to be wound from a first reel to a second reel during the recording period and rewound to the first reel for a playback cycle and then again wound on the second reel during the playback cycle, said equipment having drive means to transfer the recording medium between said reels, which comprises a switch means adapted to be angularly positioned with respect to an initial position, positioning means having an initial position and being operatively associated with said switch means and with said drive means to angularly position said switch with respect to said initial position in proportion to the actuation of said drive means, electromagnetic brake means operatively associated with the switch means and adapted to lock the switch means as angularly positioned by said positioning means, a control circuit including a latching circuit adapted to operatively connect a power source to said control circuit incident to receipt of a predetermined coded signal, a trigger means operatively connected to said telephone line circuit and responsive to a predetermined coded signal to actuate the latching circuit to lock in said control circuit to said power source independently of said predetermined coded signal, electromagnetic means in said control circuit adapted to actuate the electromagnetic brake means, electromagnetic rewind means connected in said control circuit and with said drive means to simultaneously rewind the recording medium to the first reel and retract the positioning means past its initial position, and second switch means disposed adjacent the initial position of said positioning means and actuated upon retraction of the positioning means past its initial position, said second switch means being connected in said control circuit to discontinue the rewinding of the recording medium and to thereby again wind the recording medium on the second reel and past the reproducing head to transmit the recorded messages thereon, said positioning means moving into actuating engagement with the first-named switch means after the last recorded message is transmitted, said first named switch means being connected in the latching circuit to disconnect the playback device and place the playback device into standby condition to play back subsequently recorded incoming messages.

13. Remote playback apparatus for telephone answering equipment adapted to be operatively associated with a telephone line circuit to automatically answer a telephone, said answering equipment including a drive motor operatively coupled to a pair of spaced storage reels to longitudinally advance an elongated recording medium therebetween and past a recording and reproducing head, which comprises, a first switch having a switch arm, a rotatable indexing member disposed immediately adjacent the switch arm and coupled in driven relation to said drive motor and angularly positioned away from said first switch in accordance with the actuation of said motor, a second switch rotatably mounted adjacent said indexing member and having a switch arm engaging said member and being indexed by said indexing member, spring means biasing said switch toward said member, a trigger circuit operatively associated with the telephone line circuit and responsive to electrical signals transmitted thereover, an electromagnetic controller connected in circuit with said trigger circuit and energized in response to said electrical signals, circuit altering means operated by said electromagnetic means after a predetermined period of energization of said electromagnetic controller to latch in said electromagnetic controller in a series circuit including said second-named switch, an electrically controlled brake coupled to said second switch and adapted to lock the second switch in position, circuit altering means actuated by said electromagnetic controller and adapted to actuate the brake, electromagnetic rewind means operatively coupled with said drive motor and adapted to change the coupling of the recording drive motor to a rewind connection for returning the recording means to its initial reel, circuit altering means operated by said electromagnetic controller and connected in circuit with said electromagnetic rewind means to rewind the tape in response to the predetermined energization of said electromagnetic controller and to thereby drive said indexing member toward said first switch, and an electromagnetic means connected in circuit with said first switch means and adapted to discontinue the rewinding of the recording medium and to change the motor coupling to feed the recording medium past the reproducing head to transmit the previously recorded messages over the telephone lines, said motor also driving the indexing member toward said second named switch and actuating said second named switch after transmittal of the recorded messages to open said first named circuit altering means.

14. Remote playback apparatus in accordance with claim 13 wherein said electromagnetic controller comprises a motor, a switch actuator connected in driven relation to said motor, means biasing the switch actuator to an initial position and wherein said circuit altering means comprise switches disposed in slightly spaced relation to said switch actuator whereby said predetermined energization period occurs before the switches are actuated.

15. A remote playback device for automatic telephone answering apparatus having a recording motor normally coupled to a storage reel and adapted to transfer a recording medium from an initial storage reel to a second storage reel during a recording cycle and during a reproducing cycle and having a reproducing head and a recording head disposed adjacent the recording medium and having electromagnetic rewind means to change the connection of the motor to rewind the recording medium to the first reel, which comprises a rotatable switch arm having a no-recorded message position, a reduction gearing connected to the recorder motor and to said switch arm to rotate the switch arm through a small arc in synchronism with motor operation whereby the position of said switch arm movement is proportional to the amount of the recording medium transferred to the second storage reel, a first limit switch secured adjacent said no-recorded message position for said arm and actuated by movement of the arm into engagement with the switch, a second limit switch rotatably disposed in the recording path of said switch arm and angularly positioned by said switch arm, said second limit switch having a switch actuator operatively engaged by said switch arm, an electromagnetic brake connected to said second switch and adapted to lock it in position, electromagnetic control means, a playback trigger circuit operatively connected to said telephone answering apparatus and responsive to a predetermined electrical signal to energize said electromagnetic control means, first contact means actuated by said control means to latch the control means to a power circuit serially including said second named limit switch, second contact means connected in an energization circuit for said electromagnetic brake and actuated by said control means to lock said switch in position, third contact means connected in a series circuit with said electromagnetic rewind means and said first limit switch and actuated by said control means to energize said rewind means and transfer the recording medium to the first storage reel and rotate the switch arm in a reverse direction toward the first limit switch, said switch arm moving toward said first limit switch in synchronism with the rewinding of the recording medium and actuating said first limit switch after the recording medium is rewound to its initial position, electromagnetic means adapted to open the circuit for the rewind means and connected in circuit with said first limit switch whereby the recording medium is again rewound to said second storage reel, fourth contact means connected in circuit with said reproducing head and said telephone line and actuated by said electromagnetic means to operatively connect the reproducing head to the telephone lines to transmit the previously recorded messages on the recording medium as it is rewound to said second storage reel, said switch arm being driven in a forward direction toward said second limit switch and actuating said second limit switch at the end of the recorded message, said second limit switch opening the latch circuit established by said first contact means for said electromagnetic control means and thereby returning said playback apparatus to standby to answer subsequently recorded messages.

16. Automatic telephone answering apparatus operatively associated with a telephone line circuit comprising, in combination, recording means adapted to record incoming messages, playback means including reproducing means to playback said recorded incoming messages and adapted to connect the reproducing means to the telephone line circuit for transmittal of the previously recorded messages, an integrating timer operatively associated with said recording means and including control means established by the operation of the recording means to operate after a predetermined time interval corresponding to operated time of the recording means, said control means being adapted to reset said playback means and said integrating timer to standby, means responsive to an incoming telephone ringing signal to answer the telephone and operatively connect said recording means to said telephone line circuit, and trigger means responsive to a predetermined signal received over the telephone line circuit subsequent to the answering of said telephone to actuate the integrating timer and the playback means to initiate the playback operation.

17. The combination set forth in claim 16 wherein said trigger means comprises electromagnetic means responsive to sound currents in the telephone line circuit, circuit altering means connected in circuit with said electromagnetic means and actuated thereby, said circuit altering means being adapted to actuate the integrating timer and the playback means, and time delay means biased to an initial position and connected to operatively disenable the circuit altering means during its timing period whereby the circuit altering means is only actuated after a predetermined period of continuous energization of said trigger means and said circuit altering means is thereby coded to a continuous sound current in the telephone line circuit.

18. The combination set forth in claim 16 wherein said trigger means comprises a relay responsive to sound current in the telephone line circuit, relay contacts controlled by said relay, a switch motor connected in a power circuit with said relay contact and having a switch arm biased to a de-energized position, and a plurality of switches secured in spaced relation to said arm and adapted to be simultaneously actuated thereby to limit actuation of the switches to a continuous sound current in the telephone line circuit longer than the individual current pulses resulting from normal speech transmitted over the telephone line circuit, said switches connected in circuit with said integrating timer and said playback means to initiate and correlate the operation of the timer and the playback means.

19. Automatic telephone answering apparatus associated with a telephone line circuit comprising, in combination, an outgoing message reproducer adapted to sequentially produce an initial message, a control signal and an ending message in completing a normal answering cycle, a recorder adapted to record incoming messages in response to said control signal, means responsive to an incoming telephone ringing signal to operatively connect the reproducer and the recorder to the telephone line circuit, circuit means responsive to said control signal to disconnect the reproducer from the telephone line circuit and to connect the recorder to the telephone line circuit, means responsive to the completion of said ending message to disconnect said recorder and said reproducer from said telephone line circuit, playback means adapted to transmit the messages recorded by said recorder over the telephone line circuit, control means actuated in response to a predetermined coded signal other than said ringing current received over the telephone circuit subsequent to transmittal of the initial outgoing message to actuate said playback means to only playback incoming messages received subsequent to a previous playback cycle and to stop the reproducer, said control means including a latching circuit responsive to said coded signal to connect the control means to a source of operating power independently of the maintenance of the coded signal, and means responsive to transmittal of the last recorded messages to break the latching circuit of the control means and disconnect the playback means and permit the reproducer to again operate and to complete a normal answering cycle.

20. In a circuit controlling device for recycling a mechanical movement of a member and for controlling a forward drive means adapted to move the member between an initial position and an indeterminate second position, electrically controlled means to reset the member, an arm operatively coupled to said member and moved in synchronism with said member, a first switch supported adjacent the arm position corresponding to the initial position of the arm and adapted to de-energize the means to reset the member and to energize the forward drive means, a second switch movably supported adjacent the arm and automatically indexed with respect to the first switch in accordance with the movement of the member, means responsive to a predetermined signal to lock the second switch in position and to energize said electrically controlled means to reset said member and the coupled arm until engagement with said first switch, said second switch being in said second drive circuit and opening the drive circuit for the members in response to engagement of the arm and the locked switch.

21. An integrating timer for recycling an electrically controlled means adapted to be reset to an initial starting position and for controlling an electric power circuit therefor and, which comprises actuating means operatively connected to said controlled means and moving in a forward and a reverse path in synchronism with said controlled means, first circuit altering means disposed in the forward path of the actuating means and adjacent the position of the actuating means corresponding to the starting position of the controlled means, a second circuit altering means disposed in the reverse path of the actuating means and adjacent the position of the actuating means corresponding to the starting position of the controlled means, said first circuit altering means being movably mounted and indexed in accordance with the movement of said actuating means, means actuated with the completion of an initial cycle to be repeated to lock said first circuit altering means in the then indexed position, and a recycle control circuit including said first and second circuit altering means operatively connected in said electric power circuit with one of said circuit altering means being operative to automatically reset the controlled means and with the other of said circuit altering means being operative to stop or recycle the operation of the controlled means in response to actuation by said actuating means, and starting means operatively connected in said electric power circuit to initially start a cycle of the electrically controlled means.

22. A control device conditioned in response to an initial forward cycle of mechanical movement of a member for controlling cyclic operation of forward and backward mechanical movement of the member, which comprises a switch cam movably mounted for forward and backward movement and operatively coupled to the mechanical movement to index the cam with respect to an initial position in accordance with the mechanical movement, a first switch rotatably mounted and disposed within the forward path of the switch cam, said first switch being indexed in accordance with the forward movement of said switch cam, a second switch mounted within the backward path of the switch cam adapted to stop backward movement of the member and to effect forward movement of the member, a control circuit for said member including a reset circuit to reset the member to the starting position and a stop circuit to stop the movement of the member, said reset circuit including said second named switch, said stop circuit including said first named switch and operative to discontinue forward movement of the member in response to engagement of the switch cam and the first named switch, and starting means in the control circuit to initiate recycle movement of the member including means to lock the first switch in the then indexed position and means to momentarily by-pass said first named switch to permit the member and coupled switch cam to begin to reset whereby said cam operatively disengages said first named switch.

References Cited in the file of this patent

UNITED STATES PATENTS

| | | |
|---|---|---|
| 2,724,015 | Van Deventer et al. | Nov. 15, 1955 |
| 2,761,899 | Keith et al. | Sept. 4, 1956 |
| 2,782,255 | Handschin et al. | Feb. 19, 1957 |
| 2,784,254 | Lane | Mar. 5, 1957 |
| 2,816,177 | Logan | Dec. 10, 1957 |

UNITED STATES PATENT OFFICE
CERTIFICATE OF CORRECTION

Patent No. 3,067,289 December 4, 1962

Joseph J. Zimmermann

It is hereby certified that error appears in the above numbered patent requiring correction and that the said Letters Patent should read as corrected below.

Column 5, line 29, for "to" read -- of --.

Signed and sealed this 7th day of May 1963.

(SEAL)
Attest:

ERNEST W. SWIDER
Attesting Officer

DAVID L. LADD
Commissioner of Patents